United States Patent
Martinez

(10) Patent No.: US 11,082,075 B2
(45) Date of Patent: Aug. 3, 2021

(54) AUTOMATIC GAIN CONTROL SYMBOL PARTIAL USE FOR DECODING

(71) Applicant: NXP B.V., Eindhoven (NL)

(72) Inventor: Vincent Pierre Martinez, Roques (FR)

(73) Assignee: NXP B.V., Eindhoven (NL)

( * ) Notice: Subject to any disclaimer, the term of this patent is extended or adjusted under 35 U.S.C. 154(b) by 30 days.

(21) Appl. No.: 16/451,636

(22) Filed: Jun. 25, 2019

(65) Prior Publication Data

US 2020/0007374 A1    Jan. 2, 2020

(30) Foreign Application Priority Data

Jun. 29, 2018    (EP) .................................... 18305843

(51) Int. Cl.
| | | |
|---|---|---|
| *H04B 1/10* | (2006.01) | |
| *H04L 27/26* | (2006.01) | |
| *H04L 1/20* | (2006.01) | |
| *H04L 1/00* | (2006.01) | |

(52) U.S. Cl.
CPC ............. *H04B 1/10* (2013.01); *H04L 1/0036* (2013.01); *H04L 1/20* (2013.01); *H04L 27/2647* (2013.01)

(58) Field of Classification Search
CPC ..... H04L 27/2647; H04L 1/0033; H04L 1/20; H04B 1/10
See application file for complete search history.

(56) References Cited

U.S. PATENT DOCUMENTS

| | | | |
|---|---|---|---|
| 8,605,571 B2 | 12/2013 | Takaoka et al. | |
| 2004/0181811 A1* | 9/2004 | Rakib | H04N 21/643 725/122 |
| 2005/0276337 A1* | 12/2005 | Khan | H04L 27/2607 375/260 |
| 2009/0316837 A1* | 12/2009 | Wang | H04L 27/2647 375/340 |
| 2012/0257696 A1* | 10/2012 | Mauritz | H04L 27/3809 375/345 |
| 2013/0034089 A1* | 2/2013 | Nakashima | H04L 5/001 370/337 |
| 2014/0198766 A1 | 7/2014 | Siomina et al. | |
| 2016/0381647 A1 | 12/2016 | Shahar et al. | |
| 2018/0241508 A1* | 8/2018 | Chervyakov | H04L 27/2675 |

OTHER PUBLICATIONS

Rabie, K., "Single-Carrier FDMA with Blanking/Clipping for Mitigating Impulsive Noise Over PLC Channels", 18th IEEE International Symposium on Power Line Communications and its Applications, 2014.

Tseng, S., "Robust Turbo Decoding in Single-Carrier Systems over Memoryless Impulse Noise Channels", 2016 International Conference on Advanced Technologies for Communications (ATC), IEEE 2016.

* cited by examiner

*Primary Examiner* — Kevin C. Harper

(57) ABSTRACT

A method including receiving a data subframe having a plurality of symbols, determining a location of invalid pseudo time-domain samples in the data subframe, and discarding invalid pseudo time domain samples and recovering valid pseudo time domain samples to produce an updated data subframe, and processing the updated data subframe to produce demodulated data.

15 Claims, 11 Drawing Sheets

AUTOMATIC GAIN CONTROL SYMBOL PARTIAL USE FOR DECODING

CROSS-REFERENCE TO RELATED APPLICATIONS

This application claims the priority under 35 U.S.C. § 119 of European Patent application no. 18305843.7, filed on 29 Jun. 2018, the contents of which are incorporated by reference herein.

TECHNICAL FIELD

Embodiments disclosed herein relate generally to communication, and more specifically to techniques for using automatic gain control (AGC) symbol at a receiver in a wireless communication network.

SUMMARY

A brief summary of various embodiments is presented below. Some simplifications and omissions may be made in the following summary, which is intended to highlight and introduce some aspects of the various embodiments, but not to limit the scope of the invention. Detailed descriptions of embodiments adequate to allow those of ordinary skill in the art to make and use the inventive concepts will follow in later sections.

Embodiments described herein include a method including receiving a data subframe having a plurality of symbols, determining a location of invalid pseudo time-domain samples in the data subframe, and discarding invalid pseudo time domain samples and recovering valid pseudo time domain samples to produce an updated data subframe, and processing the updated data subframe to produce demodulated data.

The invalid pseudo time domain samples may be generated based on an electro-magnetic perturbation performed on the subframe.

The plurality of symbols may be single carrier frequency-division multiple access (SC-FDMA) symbols.

The discarded pseudo time domain IQ samples may be disposed in a first part of a first symbol of the received data subframe.

The recovered pseudo time domain samples may be disposed in a second part of a first symbol of the received data subframe.

Discarding the corrupted pseudo time domain samples may include zeroing out the corrupted pseudo time domain samples.

The invalid pseudo time domain samples may be generated during an electro-magnetic perturbation settling time.

The invalid pseudo time domain samples may be generated during a settling of the AGC.

Embodiments may also include a demodulator apparatus including an automatic gain controller (AGC) to scale a received signal having a plurality of subframes, a fast Fourier transform (FFT) to transform the received signal into the frequency domain, a physical Sidelink channel to decode the frequency domain signal, the physical Sidelink channel including an inverse discrete Fourier transform (IDFT) to transform a data subframe to the time domain and a symbol controller configured to determine a location of invalid pseudo time-domain samples in the subframe and output an updated data subframe, wherein the physical Sidelink channel further processes the updated data subframe to produce demodulated data.

The symbol controller may discard the invalid pseudo time domain samples and recover valid pseudo time domain samples to produce the updated data subframe. AGC may generate the invalid pseudo time domain samples of the subframe. The plurality of subframes may include single carrier frequency-division multiple access (SC-FDMA) symbols.

The discarded pseudo time domain samples may be disposed in a first part of a first symbol of the received data subframe. The recovered pseudo time domain samples may be disposed in a second part of a first symbol of the received data subframe. The symbol controller may discard the corrupted pseudo time domain samples including zeroing out the corrupted pseudo time domain samples.

BRIEF DESCRIPTION OF THE DRAWINGS

Additional objects and features of the invention will be more readily apparent from the following detailed description and appended claims when taken in conjunction with the drawings. Although several embodiments are illustrated an described, like reference numerals identify like parts in each of the figures, in which:

DETAILED DESCRIPTION

Figure 1:
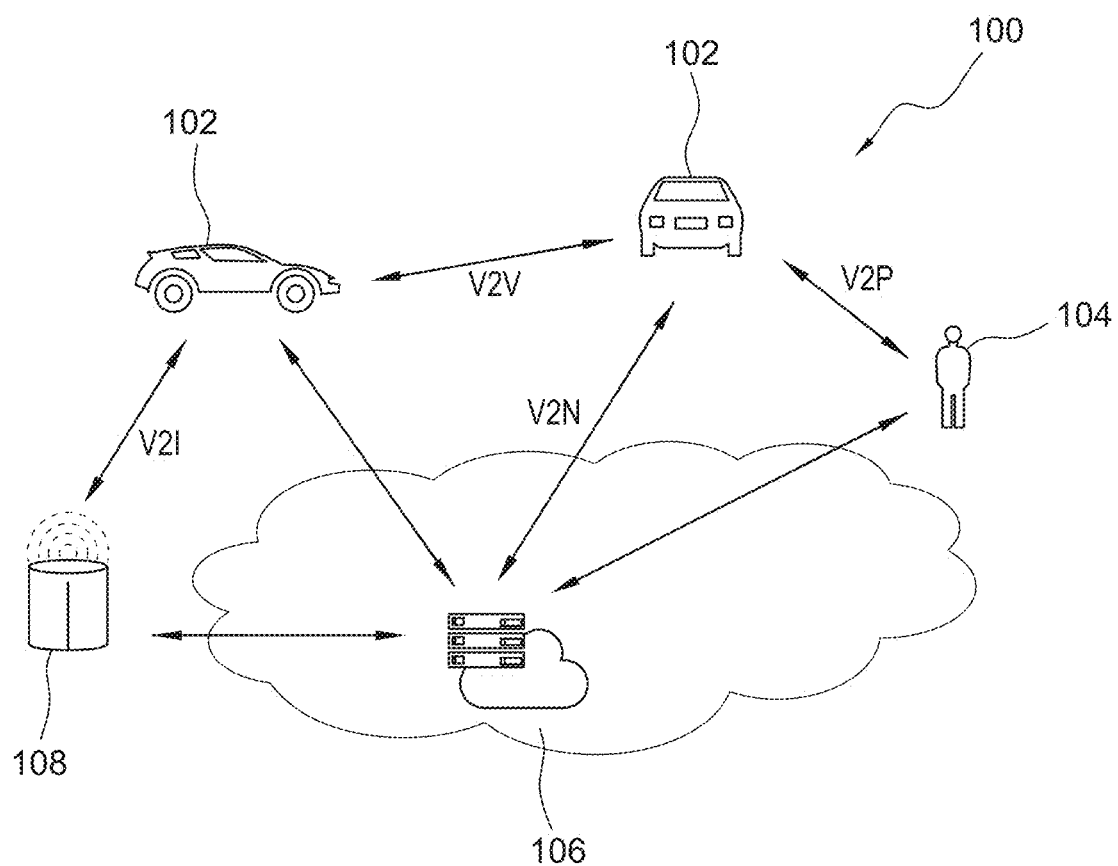
FIG. 1 illustrates a Vehicle to Everything (V2X) network in accordance with embodiments described herein.

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. Descriptors such as "first," "second," "third," etc., are not meant to limit the order of elements discussed, are used to distinguish one element from the next, and are generally interchangeable. Values such as maximum or minimum may be predetermined and set to different values based on the application.

Wireless communication networks are widely deployed to provide various communication services such as voice, video, packet data, messaging, broadcast, etc. These wireless networks may be capable of supporting communication for multiple users by sharing available network resources. Examples of such wireless networks include may be used in Third Generation Partnership Project (3GPP) Cellular Vehicle-to-Everything (C-V2X), namely Long Term Evolution Release 14 (LIE Rel-14), Long Term Evolution Release 15 (LTE Rel-15) and Fifth Generation New Radio (5G NR V2X).

FIG. 1 illustrates a Vehicle to Everything (V2X) network 100 in accordance with embodiments described herein. V2X communications includes four types of communications: vehicle-to-vehicle (V2V), vehicle-to-infrastructure (V2I), vehicle-to-network, (V2N) and vehicle-to-pedestrian (V2P). The V2X network 100 may enable an exchange of information between one or a plurality of vehicles 102 and people 104 using V2P, such as bicyclists and pedestrians for alerts. Using V2P, one party may be a user equipment (UE) equipped on a vehicle and the other party is a UE which is carried by an individual (e.g., handheld terminal carried by a pedestrian, cyclist, driver or passenger).

One or more vehicles 102 may use V2V fit a variety of use cases, such as emergency electronic brake light, emergency vehicle approaching notification or collision avoidance but not limited thereto, where both parties of the communication are UEs equipped on different vehicles. Infrastructure 108 may use V2I such as roadside devices for timing and prioritization, where one party is a UE equipped on a vehicle and the other party is a road side unit (RSU). RSU represents the connected vehicle road side devices that are used to send messages to, and receive messages from, nearby vehicles using V2X technologies.

A network 106 may use V2N for real time traffic routing and other cloud travel services, where one party is a UE equipped on a vehicle and the other party is an application server (e.g., traffic safety server). A goal of V2X is to improve road safety, increase the efficiency of traffic, reduce environmental impacts and provide additional traveler information services.

Though communication is described in accordance with the V2X network 100, embodiments are not limited thereto. Communication principles and descriptions herein may relate to communication system using all types of user equipment (UE) such as cellular phones, laptops, tablets, computers, and the like.

The 3GPP V2X is a synchronous system. All users are assumed to be synchronized on a common reference timing such as Global Navigation Satellite System (GNSS). Use of 3GPP obviates the use of synchronization preambles (compared to IEEE 802.11p), which may reduce overhead. The label 802.11p will be used throughout the text referring to when the dot11OCBActivated is set to true enabling communication outside the context of a BSS in IEEE 802.11-2016. However, this synchronous nature creates challenges. Transmitting messages without a preamble sequence prefix, the first SC-FDMA symbol of each subframe might not be available for channel decoding at the receiver, because it might be used for automatic gain control (AGC) calibration purposes, a phase during which the receiver's transceiver gain is being adjusted to match the required input dynamic expected by the analog to digital converter (ADC). As a result of this AGC settling phase, some time-domain in-phase/quadrature (IQ) samples pertaining to the first SC-FDMA symbol might not be valid for the receiver to use (for example some IQ samples might be saturated). From a general perspective, embodiments described herein include a situation where some IQ samples are corrupted and not available for use by the receiver. Such corrupted samples can be located in any SC-FDMA to data symbol, not limited to the first SC-FDMA symbol. Examples of other phenomena that can lead to corrupted IQ samples for several μs, can be electro-magnetic perturbations due to car's engine ignition, or inter-symbol interference (ISI) caused by a fading channel with delay taps larger than the cyclic prefix (CP) duration.

Although modern AGC calibration routine lasts only for a few μs, in 4G LTE the SC-FDMA symbol duration is much longer, such as 72 μs. For reference, the AGC settling time in IEEE 802.11p may be less than 16 μs (16 μs is the duration of the legacy short training field (L-STF) in the preamble). Thus, discarding a 72 μs symbol due to ACG calibration purposes in LTE-V2X might be seen a waste of spectrum and time. This inefficiency is due to the fact that LTE Sidelink transmission re-uses most of the LTE Uplink waveform principles, which was designed for a cellular application, where a power-control loop can be instantiated between the UE and the base-station, something that cannot be set up in the broadcast only system like V2X Sidelink.

Figure 2:
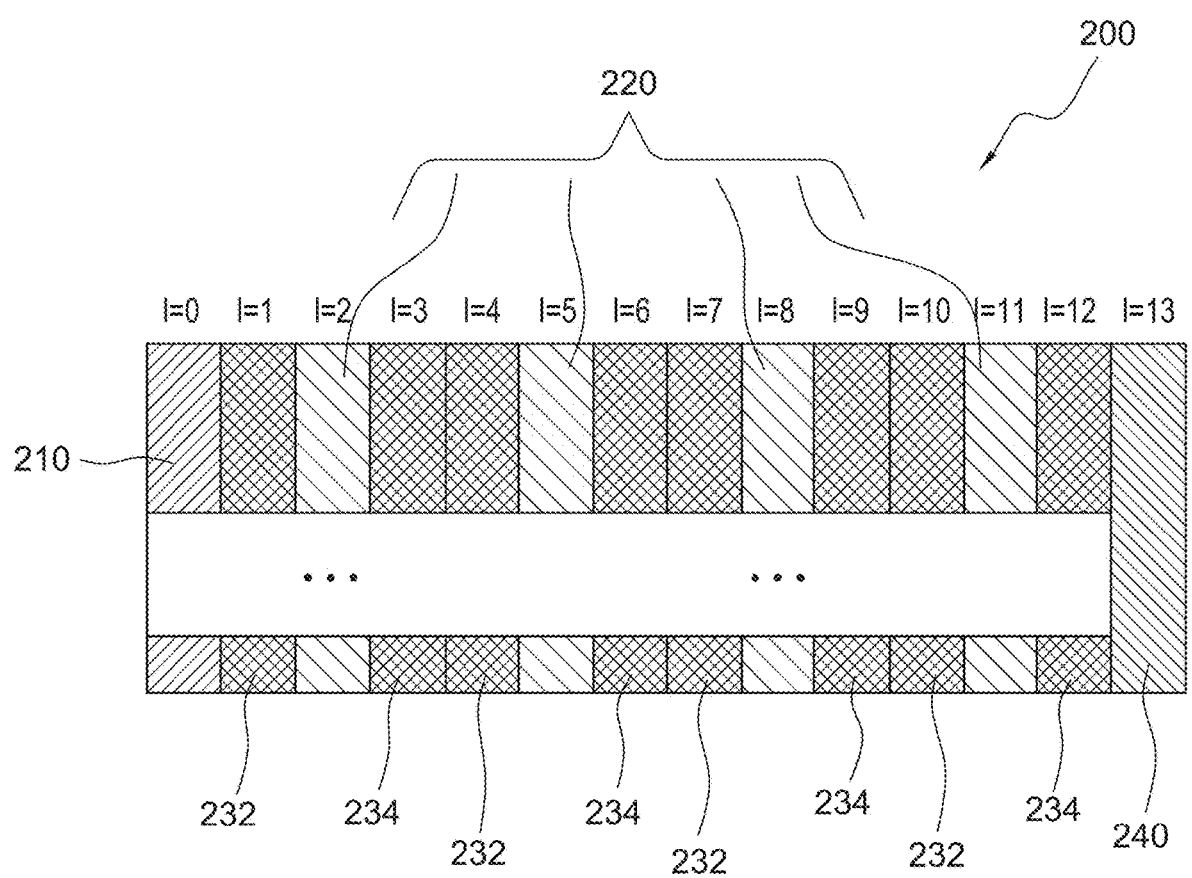
FIG. 2 illustrates a Sidelink data subframe in accordance with embodiments described herein.

FIG. 2 illustrates a Sidelink data subframe 200 in accordance with embodiments described herein. Sidelink refers to direct communication between two or more nearby devices (UEs), also known as PC5, and sometimes denoted LTE-direct, using E-UTRA technology but not traversing any network node. Uplink may represent the action of sending a communication from a UE to a network base-station. The principles described herein for the Sidelink data subframe 200 may also be used for Uplink data subframes. The Sidelink data subframe 200 may represent 14 single carrier frequency-division multiple access (SC-FDMA) symbols. The 14 symbols may be transmitted in 1 ms time blocks, known as a subframe in LTE terminology, but embodiments are not limited thereto. A data subframe may be made up of more or less symbols and be transmitted in a smaller or larger time block in another application.

The Sidelink data subframe 200 may be broken into two 0.5 ms slots. A first 0.5 ms slot may include seven symbols, and a second 0.5 ms slot may include another seven symbols. A first symbol 210 in the Sidelink data subframe 200 may be used for AGC. The transmitted Sidelink data subframe 200 may include a physical Sidelink shared data channel (PSSCH) 232 and a physical Sidelink control channel (PSCCH) 234, which are both transmitted during the same symbol indexes (0, 1, 3, 4, 6, 7, 9, 10, 12) although on a different set of subcarriers. The first symbol 210 thus carries PSSCH and PSCCH information. Separating pairs of the PSSCH and PSCCH symbols are DMRS (demodulation reference signal symbols) 220, which are also transmitted by the UE, and also on the same set of subcarriers are the PSSCH & PSCCH. The DMRS are carrying a known pattern for the receiver to perform channel estimation.

As illustrated in FIG. 2, the last symbol 240 in the Sidelink data subframe 200 is a gap symbol, not transmitted by the transmitter (as per LTE V2X specification). This gap symbol 240 may be used to allow some time for a transmitter to receive (TX-to-RX) turnaround.

Figure 3:
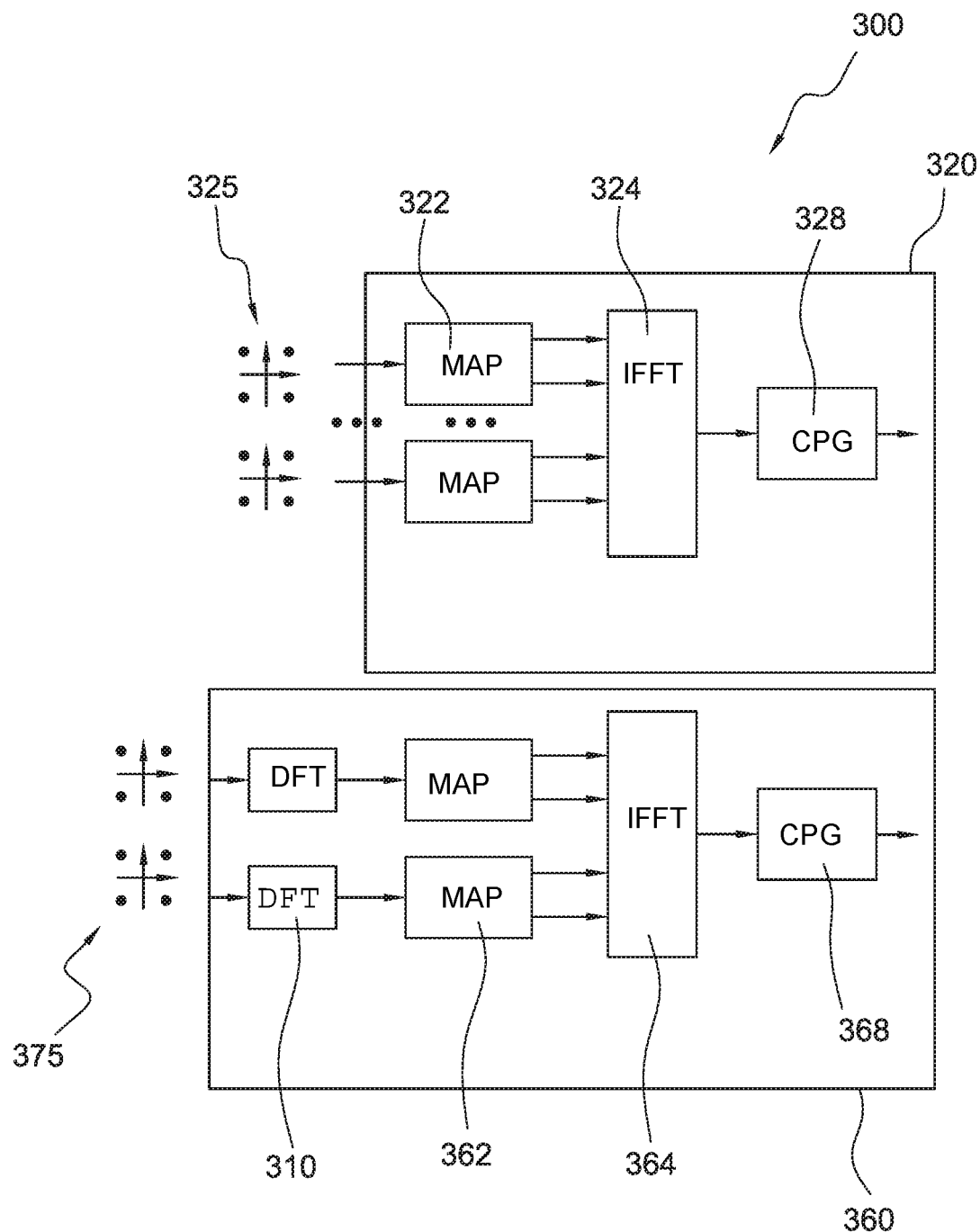
FIG. 3 illustrates a block diagram of a design of an OFDM modulator and a SC-FDMA modulator in accordance with embodiments described herein.

FIG. 3 illustrates a block diagram 300 of a design of an OFDM modulator 320 and a SC-FDMA modulator 360 in accordance with embodiments described herein. The OFDM modulator 320 represents a Downlink transmission sequence. Within OFDM modulator 320, a symbol-to-subcarrier mapper 322 may receive modulation symbols 325, map the modulation symbols to subcarriers used for transmission, and map zero symbols with a signal value of zero to the remaining subcarriers. The symbol-to-subcarrier mapper 322 may input symbols fro User 1 to User N. An inverse fast Fourier transform (IFFT) unit 324 may receive N mapped symbols for the N total subcarriers, transform the N mapped symbols to the time domain with the N-point IFFT 324, and provide N time-domain IQ samples, which may be referred to as a useful portion. Each sample is a complex value to be sent in one sample period. A cyclic prefix generator 328 may copy the last C samples of the useful portion and append these C samples to the front of the useful portion to output an OFDM symbol containing N+C samples. The copied portion is referred to as a cyclic prefix, and C is the cyclic prefix length. The cyclic prefix is used to combat inter-symbol interference (ISI) caused by frequency selective fading. An OFDM symbol may be sent in one OFDM symbol period (or simply, one symbol period).

FIG. 3 also illustrates a block diagram of a SC-FDMA Uplink/Sidelink modulator 360, which includes a discrete Fourier transform (DFT) precoder unit 310 followed by an OFDM modulator 320. The DFT precoder unit 310 converts a time domain single carrier (SC) modulation symbols 375 into M output tones. In other words, the DFT precoder unit 310 may receive M modulation symbols 375, transform these modulation symbols 375 to the frequency domain with the M-point DFT precoder unit 310, and provide M frequency-domain symbols. The M frequency-domain symbols, or output tones, are fed into a symbol-to-subcarrier mapping block 362 that maps the DFT precoder unit 310 output tones to specified subcarriers for transmission. After subcarrier mapping, an inverse fast Fourier transform (IFFT) 364 converts mapped subcarriers back into the time domain for transmission. The cyclic prefix block 368 is pre-pended to a composite SC-FDMA symbol to provide multipath immunity. The mapped subcarriers are appended with the cyclic prefix to output an SC-FDMA symbol. Pulse shaping may be employed to prevent spectral regrowth. A final radio front end (RFE) block may convert the digital signal to analog and upconverts it to RF for transmission.

As illustrated in FIG. 3, SC-FDMA modulator 360 uses the additional DFT precoder unit 310 compared to OFDM, before placing Quadrature Phase Shift Keying-Quadrature. Amplitude Modulation (QPSK-QAM) symbols on the IFFT 364 grid. The "domain" before the DFT precoder unit 310 at TX (or after IDFT inverse precoder at RX) can be referred to as a "pseudo time domain". This domain is not exactly the time domain, because of the precoder DFT and IFFT operations and not exactly the functional inverse of each other. The IFFT is generally of larger (for example 1024-points for LTE 10 MHz systems), and centered, while the DFT precoder may span only over the subcarriers used by a given user (which will be between 12 and 600 subcarriers in the case of LTE 10 MHz for example). It is generally admitted that usage of DFT precoder unit 310, for example as taught by 3GPP LTE specifications contributions, improves the peak-to-average power ratio (PAPR) performance of the transmitted message compared to OFDM 320. In the SC-FDMA modulator 360, symbol mapping may be done in the pseudo time domain. The DFT precoder unit 310 spreads each symbol over the user's subcarriers.

Knowing a location of invalid time-domain samples (due to AGC calibration, but not limited to, for example electromagnetic effects that might blind the receiver for several µs), embodiments described herein may discard invalid "pseudo time domain" samples, while keeping valid "pseudo time domain" samples. Typically, the pseudo time domain samples that are kept during the first AGC-purposed SC-FDMA symbol are within the second part of such symbol. Typically, all the pseudo time domain samples are kept for the subsequent SC-FDMA symbols. Embodiments thus translate time-domain samples indexing to corresponding "pseudo time domain" samples indexing. Embodiments described herein take advantage of underlying waveforms used by C-V2X, namely SC-FDMA.

Figure 4:
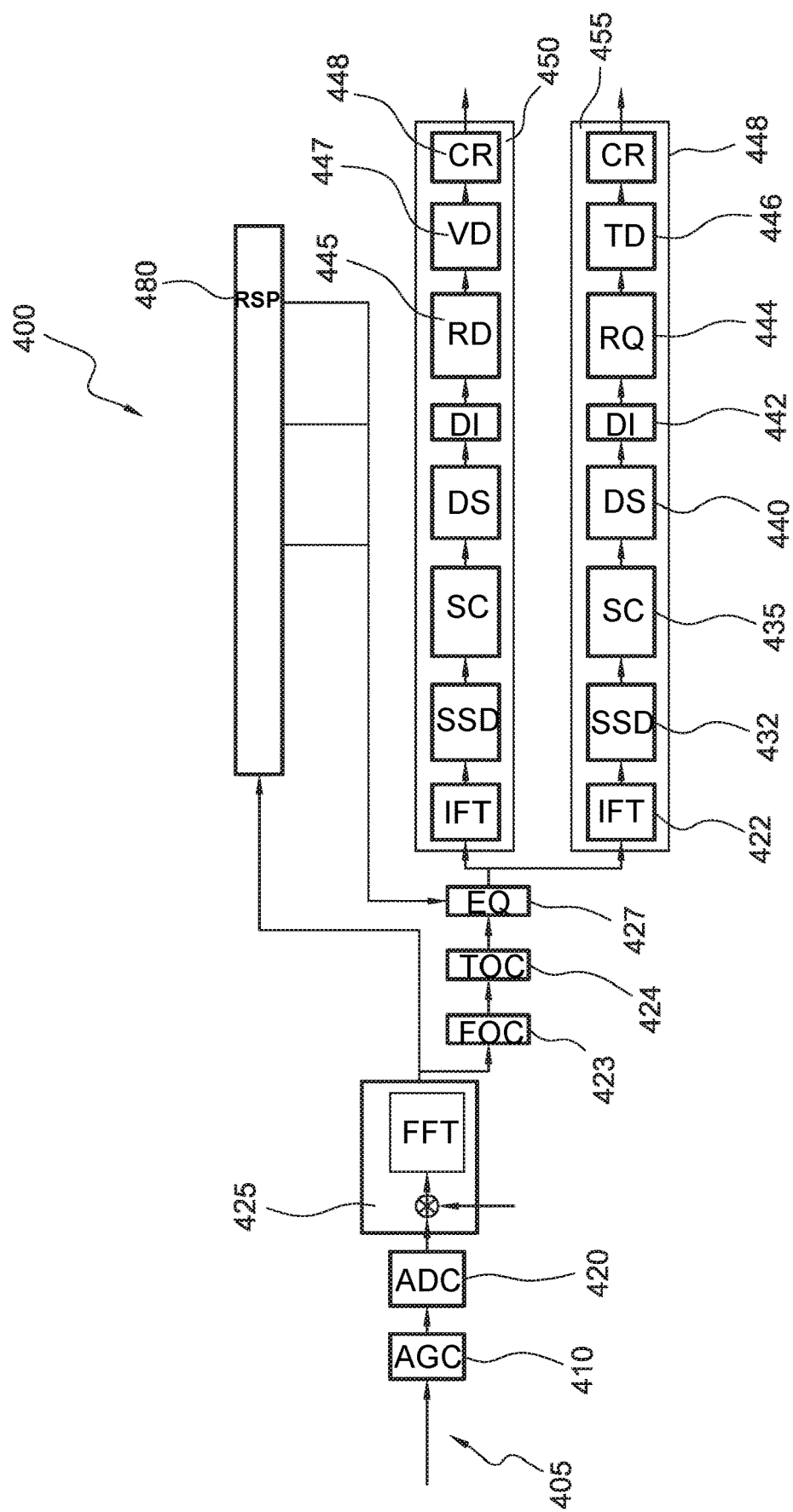
FIG. 4 illustrates a decoding chain in accordance with embodiments described herein.

FIG. 4 illustrates a decoding chain 400 in accordance with embodiments described herein. Receipt of antenna data 405 into a decoding chain may begin with automatic gain control (AGC) block 410. A purpose of the automatic gain control (AGC) 410 block is to regulate a received signal strength at an input of a low noise amplifier analog to digital converter (LNA ADC) 420 such that the required signal dynamic for proper decoding is met. For example, if the received signal strength is weak for the antenna data 405, an AGC algorithm may boost the receiver gain stages in order to minimize the ADC quantization noise. Likewise, if the received signal strength is too strong, the AGC algorithm may attenuate the receiver gain stages in order to avoid signal clipping and nonlinear degradations that would otherwise deteriorate the signal SNR. In receivers that employ modern digital modulation techniques, the AGC block 410 may correct for long term fading effects due to shadowing or high-speed UE. The action of the AGC block 410 may be referred to as scaling a received signal.

After conversion in the LNA ADC 420, a fast Fourier transform (FFT) 425 window may bring the input signal back into the frequency domain. A cyclic prefix and guard may be removed before the FFT. The subframe may pass through a frequency offset correction 423 and time offset correction 424. The short term fast fades, especially those denoted as frequency selective fades, are corrected for in the digital equalizer (EQ) 427, the EQ 427 being a rake receiver, a decision feedback equalizer (DFE), or any other form of equalization designed to deal with this type of fading. After equalization, the data is further processing in the decoding blocks 450 or 455 using decoding schemes as described herein.

Embodiments described herein apply to PSSCH 455 data channel decoding and to PSCCH 450 control channel decoding. Instead of keeping an entire first symbol, or discarding an entire first symbol, typically before an inverse discrete Fourier transform 422 (IDFT), a finer granularity may be achieved, using SC-FDMA properties.

Regarding V2X, a vehicle 102, for example, may include a user equipment that uses the decoding scheme illustrated in FIG. 4. The user equipment in the vehicle 102 may obtain a received signal comprising the signals from a plurality of transmitters and having a received power level. The user equipment in the vehicle 102 may scale (e.g., amplify or attenuate) the received signal with a receiver gain and may obtain an ADC input signal out of LNA ADC 420 having an input power level. The user equipment in the vehicle 102 may amplify the received signal if the receiver gain is greater than one or attenuate the received signal if the receiver gain is less than one.

During AGC, a first received symbol in the Sidelink data subframe 200 may be corrupted during a settling time of the AGC. The AGC settling time may be a part of receiver implementation. An AGC may work autonomously and inform a physical layer modem whether it changed its gain and by how much, such as whether a first symbol got corrupted or not. An AGC settling time may be designated by a supplier, such as between 2 and 8 μsec or higher.

The user equipment in the vehicle 102 may process the M samples in the FFT window 425 to recover modulation symbols sent by the transmitters described with reference to FIG. 3. The user equipment in the vehicle 102 may perform AGC based on M samples within a first symbol of the AGC window, which may precede the FFT window 425. The actions of the AGC block 410 create some log likelihood ratio (LLR) values associated with AGC calibration time.

According to embodiments described herein, in order to exclude corrupted samples and recover a second section of the first symbol, a symbol controller 435 may be used in the PSCCH control channel decoding chain 450 and in the PSSCH codeword decoding chain 455. The symbol controller 435 may be a form of signal processing or control code. The symbol controller 435 may discard or zero-out the log likelihood ratio (LLR) values associated with AGC calibration time, or any other phenomenon that might have led to corrupted samples. The LLR are typically generated by a Soft symbol demapper block 432, which takes as an input the IDFT inverse precoder output 422. In some implementation, and for some symbol constellations (for example QPSK), zeroing out the input of the soft symbol demapper or its outputs is equivalent. In some other implementations, zeroing out the input of the soft symbol does not lead to zero-valued LLR. Thus we depict the symbol controller 435 placed after the soft symbol demapper for more genericity, although in some implementation it can be placed before the soft symbol demapper, which might in certain cases reduce the amount of computations spent soft symbol demapper block.

Figure 5:
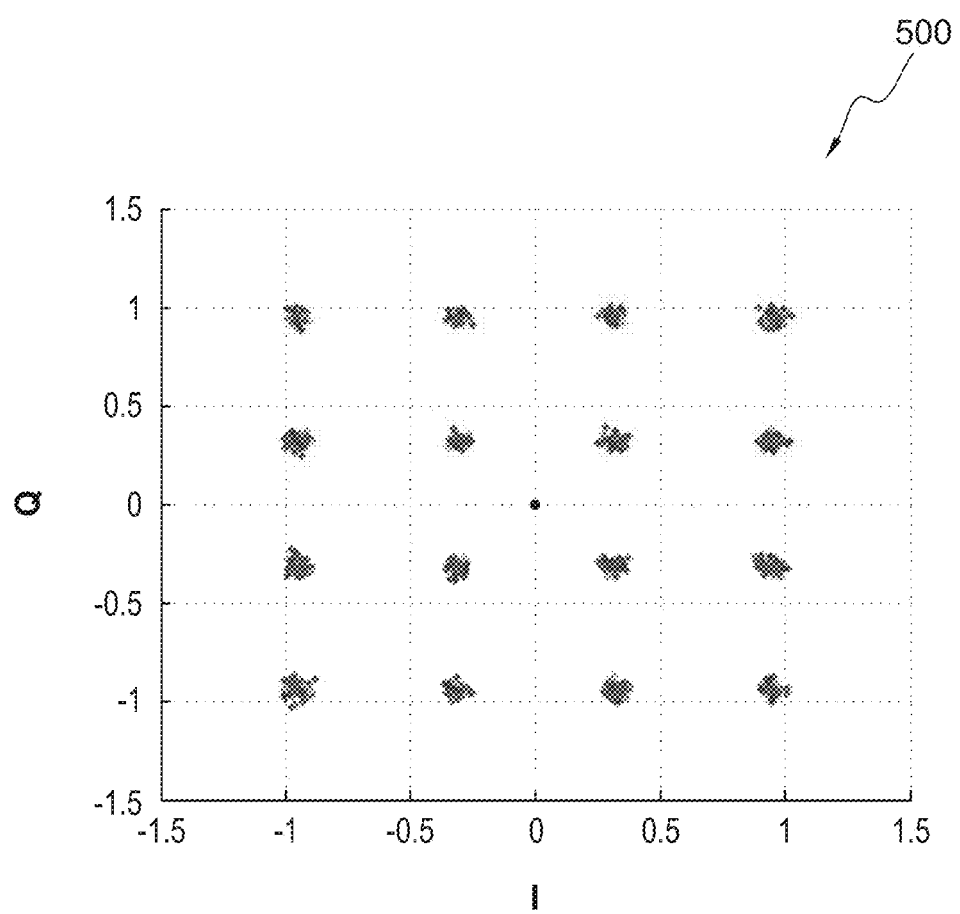
FIGS. 5-7 illustrate representations of codeword decoding of a PSSCH data channel according to embodiments described herein.
Figure 6:
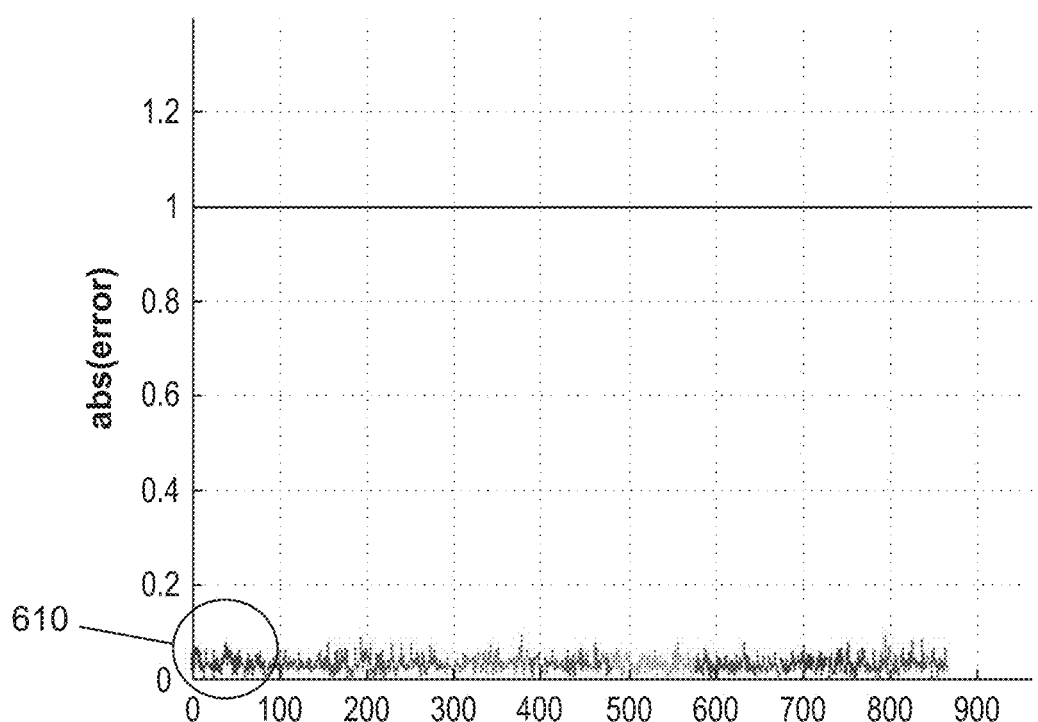
Figure 7:
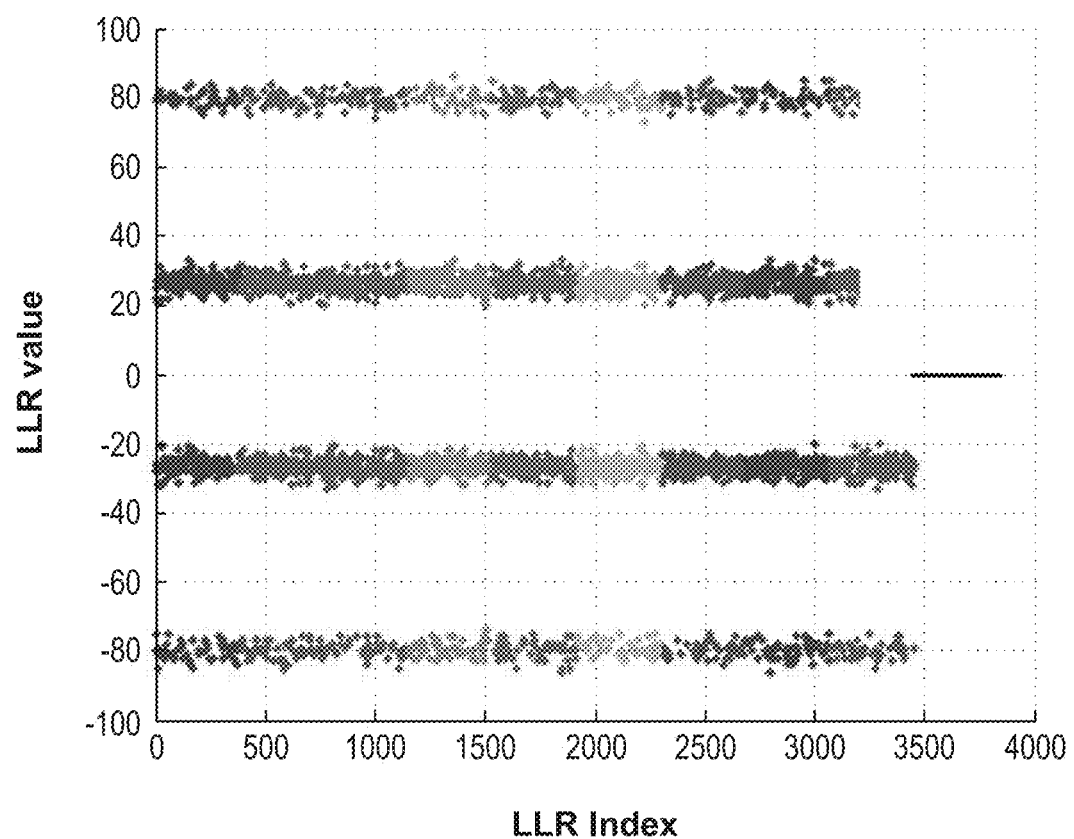

FIGS. 5-7 illustrate representations of codeword decoding of a PSSCH data channel 455 according to embodiments described herein. FIG. 5 illustrates equalized constellation points output from the IDFT 422. In FIG. 5, a first symbol is fully available to the receiver. There was no AGC calibration run. After operation by the IDFT 422, the constellation diagram 500 illustrates all symbols nicely equalized. Illustrated is a 16-Quadrature Amplitude Modulation (QAM).

FIG. 6 illustrates a view of error versus transmitted sequence in accordance with FIG. 5. The data of FIG. 5 is represented in another view. FIG. 6 illustrates a comparison to QAM symbols that were transmitted. There may be about 30 dB signal to noise ratio (SNR). The error is small, and is constant for all symbols, including the first symbol. In FIG. 6 a first symbol 610 may have low error, similar to the plurality of symbols that follow. FIG. 7 illustrates a de-mapper in accordance with FIGS. 5 and 6. Using a soft symbol de-mapper (LLR generation), a 16-QAM pattern of LLR values 700 may again be recognized. The patterns may also very clean due to high SNR.

Figure 8:
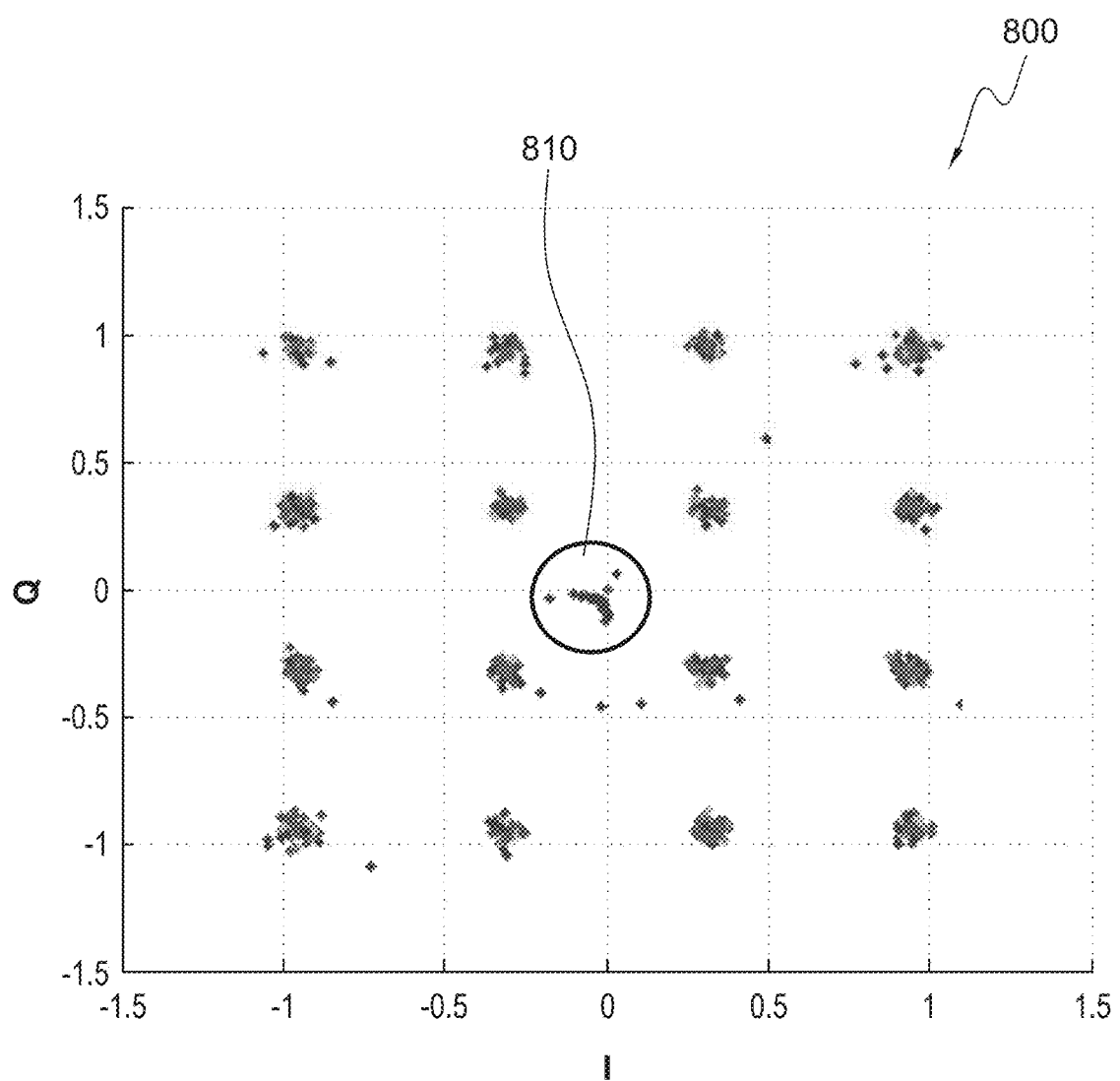
FIGS. 8-10 illustrate situations when a first symbol is not entirely available to a receiver due to an AGC calibration run in accordance with embodiments described herein.
Figure 9:
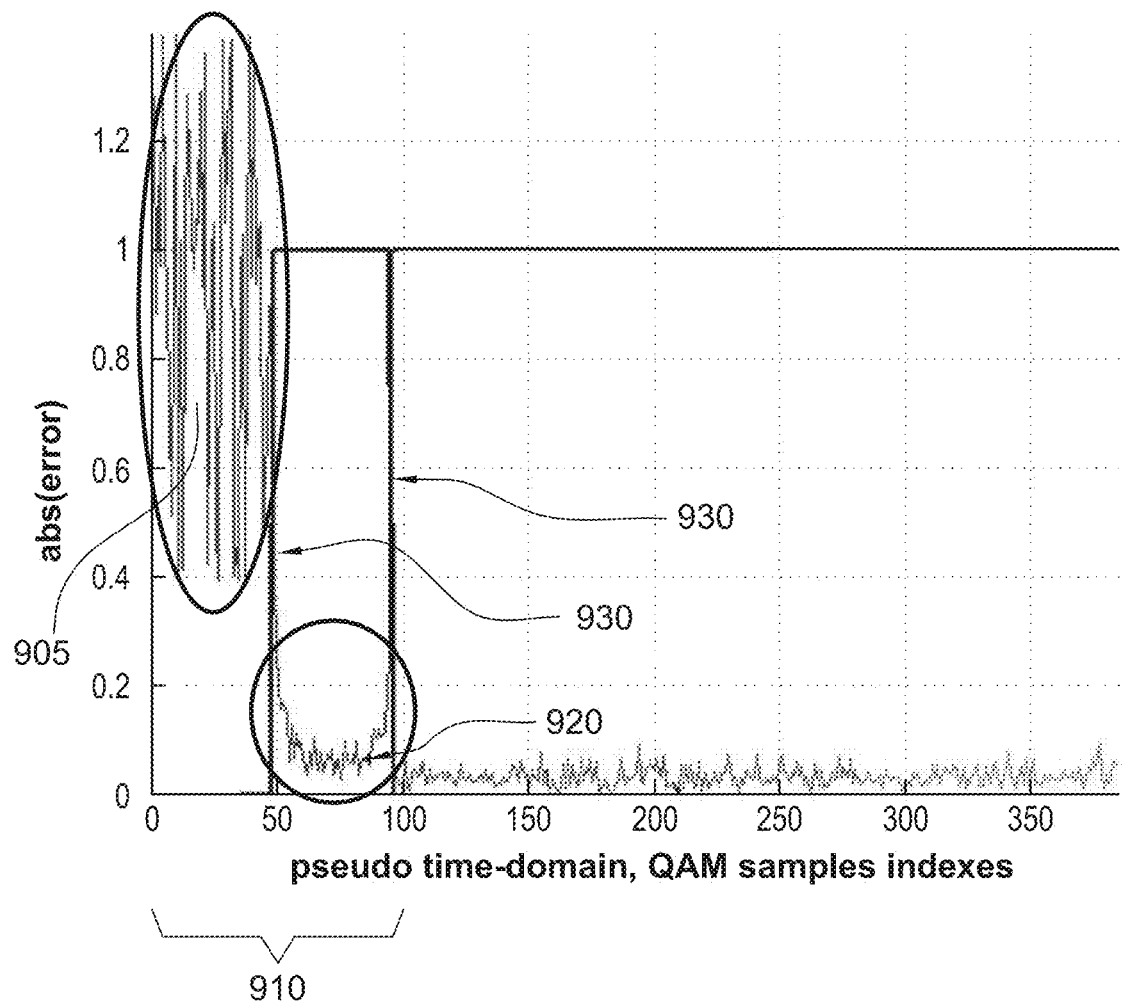
Figure 10:
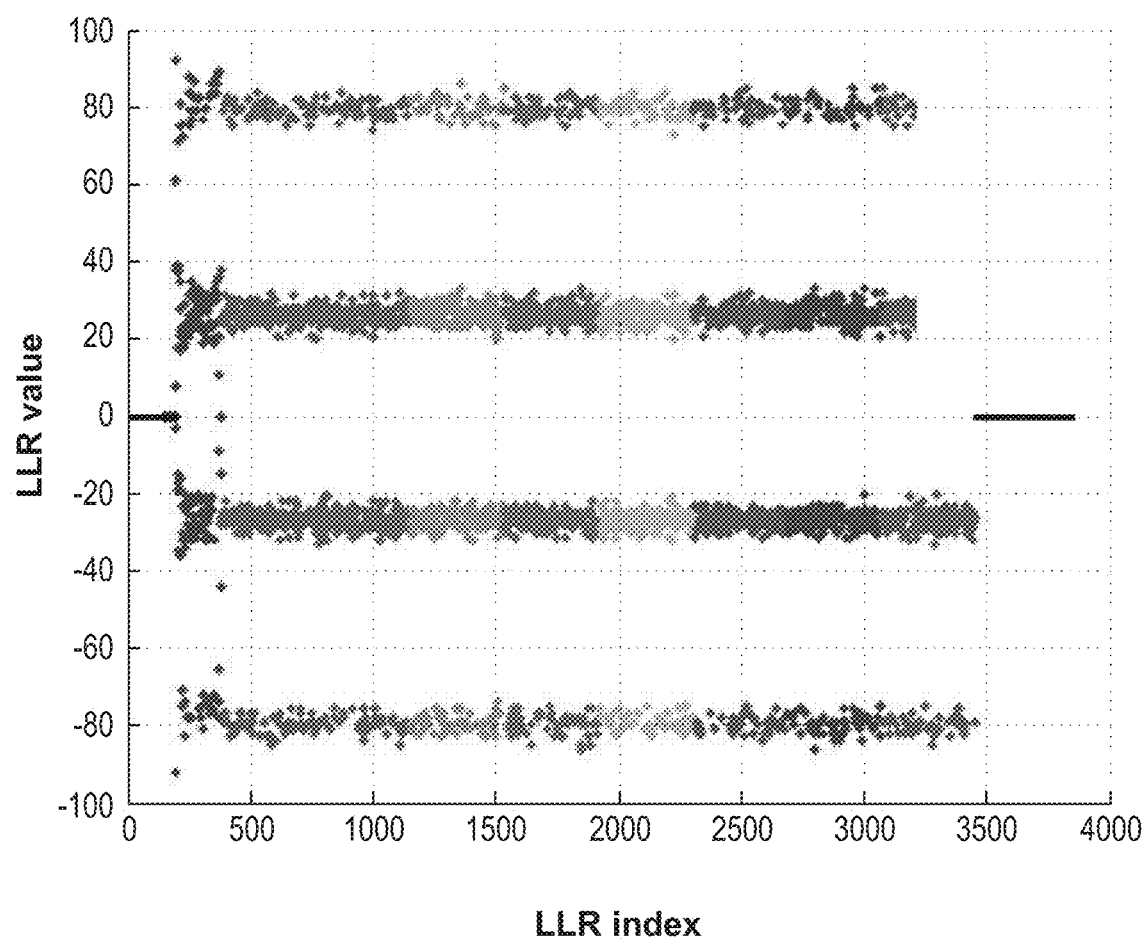

FIGS. 8-10 illustrate situations when a first symbol is not entirely available to a receiver during an AGC calibration run in accordance with embodiments described herein. For example, an AGC time may be substantially equal to a half symbol, on the order of 36 μs, as described with reference to FIG. 11 and herein.

As illustrated in FIG. 8, after IDFT 422, the constellation diagram 800 illustrates all symbols equalized nicely, except for a first symbol 810, where there are some aberrations in the center of the plot. Here, the first symbol 810 is corrupted. A typical prior-art method would remove and discard all the first symbol 810 values.

FIG. 9 illustrates another view of the data in accordance with FIG. 8. FIG. 9 illustrates equalized constellation points (IDFT output), error versus a transmitted sequence. The abscissa represents the pseudo time-domain, QAM samples indexes. The ordinate axis is the error rate. FIG. 9 illustrates an error comparison to QAM symbols what were transmitted. It can be seen that invalid or corrupted QAM symbols are located at the beginning of a first SC-FDMA symbol 910, which is when the AGC calibration was running and punctured the data.

It can be seen that substantially a first portion 905 such as a half of the first symbol 910 is heavily corrupted. Therefore, substantially the second half 920 of the first SC-FDMA symbol 910 can be productively used. This portion 920 is within with the "data validity" solid lines 930.

Referring to FIG. 4, symbols output by the IDFT 422 are then demapped by the soft symbol demapper 432, and LLR are generated. Accordingly, the LLRs belonging to the first portion 905 of the SC-FDMA symbol 910 will be input to the symbol controller 435 and zeroed-out by the symbol controller 435, the corrupted portion of the symbol thereby discarded. By this method, substantially half, or the usable portion of the symbol undergoing AGC is kept, but embodiments are not limited thereto. Half of the usable portion is an example. In practice, with AGC lasting for 4 to 8 μs depending on implementation designs, up to about 90% of the SC-FDMA symbol may be kept. The ratio will vary depending on use case.

In the PSSCH 455, after a valid portion of a symbol is recovered by the symbol controller 435, the Sideframe is further processed by a descrambler 440 and passes through a de-interleaver 442. A hybrid automatic repeat request (HARQ) 444 is present to combine two or more of the same subframes that received more than once. After HARQ 444, a subframe may pass through a turbo decoder 446, a cyclic redundancy check 448, and a demodulated signal is output.

In the PSCCH 450, similar processing takes place until the de-interleaver 442. After that, a rate-dematching 445 will take place, followed by decoding in a Viterbi decoder 447, and the cyclic redundancy check 448, before outputting a demodulated signal.

The decoding chain 400 also includes a reference symbol processing (RSP) block 480 to operate on demodulation reference signal (DMRS) symbols in the received subframes. The RSP block 480 may perform an initial identification of symbols in received subframes and input this information known was channel estimate, to the equalizer 427 to help with equalization.

Techniques for performing AGC based on a cyclic prefix of a SC-FDMA symbol are described herein. As illustrated in FIG. 2, the Sidelink data subframe 200 may have a symbol dedicated to AGC, then twelve symbols, then the gap symbol 240, but embodiments are not limited thereto. A Sidelink data subframe 200 may be of smaller or greater lengths having lesser or more symbols and still include the first symbol 210, which may be an AGC symbol, and capped by the gap symbol 240. A receiver may scale (amplify or attenuate) the SC-FDMA symbol based on an initial receiver gain, adjust the initial receiver gain based on the cyclic prefix of the SC-FDMA symbol, and apply the adjusted receiver gain prior to the useful portion of the SC-FDMA symbol.

Performing AGC causes irregularities. In previous methods, when an AGC process corrupted a segment of a useful portion of a first symbol, a receiver was programmed to discard an entire first symbol, losing a valuable portion of incoming data.

Used with embodiments described herein, a settling time of the AGC block 410 spans a time during which the first symbol is corrupted, before a portion of the first symbol is available. The symbol controller 435 is able to detect the amount of settling time of the AGC block 410 and based on that time, zero-out or discard the first portion 905 of a received symbol that corresponds to the corrupted first portion. Instead of discarding an entire first symbol such as has been done previously, embodiments described herein are designed to recognize and discard only the corrupted portion 905, leaving a portion 920 intact to decipher an incoming message. The receiver may then process the portion 920 to add to the remaining symbols of the Sidelink data subframe 200.

Figure 11:
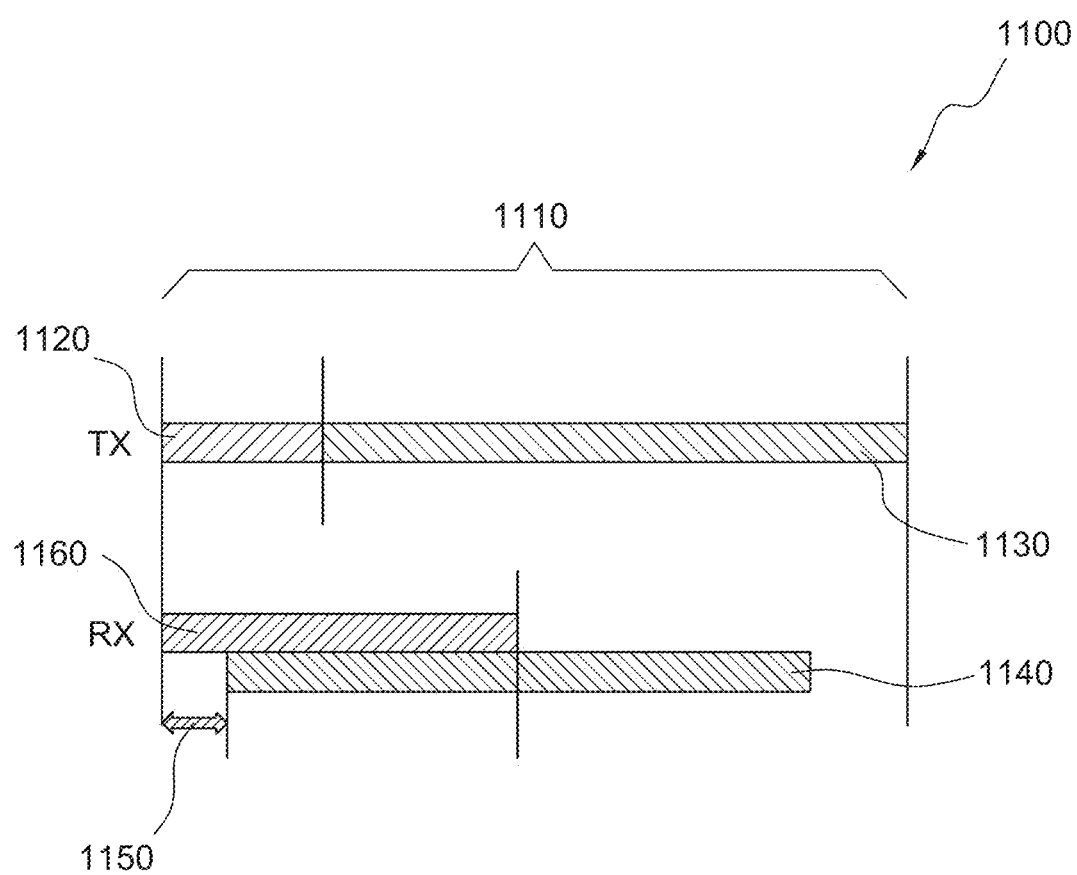
FIG. 11 illustrates a translation of indexes in accordance with embodiments described herein.

FIG. 11 illustrates a translation of indexes 1100 in accordance with embodiments described herein. A generic rule may be used that helps translating from the valid and invalid time domain IQ samples index, to the valid and non-valid LLRs indexes. There may be a linear correspondence between these two indexes. For example, using a first SC-FDMA symbol 1110 with a duration of 1104 IQ samples (organized as 80 IQ samples of cyclic prefix 1120 and 1024 IQ samples of "data" 1130). Using the receiver's FFT window 1140 of 1024 samples starting at an offset of 36 IQ samples 1150 (which represent half of the cyclic prefix duration as indicated by LTE conformance test specifications), and a AGC settling time 1160 of 548 IQ samples (representing approximately 36 μs), the first 50% of the FFT window samples may be corrupted because (548−36)/1024=50%.

While the portion of the symbol to be zeroed out has been described as the first portion of the symbol, the zeroing out may be applied to any portion of the symbol that is known to be corrupted. For example, the middle 50% of the first symbol may be corrupted, such that the middle 50% portion will be zeroed out, leaving the first 25% and the last 25% of the symbol for processing. Alternatively, an end portion of the symbol may also be the corrupted portion to be zeroed out, such as within the last 25% of the symbol. Embodiments thus translate time-domain samples indexing to corresponding "pseudo time domain" samples indexing.

Embodiments described herein apply to any wireless standard that are based on SC-FDMA, and without a power-control closed loop or AGC-preambles. Typically, they would be synchronous type of transmissions like 4G and 5G.

Embodiments can be applied to the following standards including 4G LTE-D2D Device to Device Rel-12, 4G LTE-V2X Rel-14, 4G LTE-V2X Rel-15, and 5G NR-V2X Rel-15/16. For 4G LTE-V2X Rel-14 and Rel-15, use of the symbol controller 435 to rescue part of the corrupted symbol applies both to the control channel (PSCCH) and the data channel (PSSCH).

Although the various exemplary embodiments have been described in detail with particular reference to certain exemplary aspects thereof, it should be understood that the invention is capable of other embodiments and its details are capable of modifications in various obvious respects. As is readily apparent to those skilled in art, variations and modifications can be effected while remaining within the spirit and scope of the invention. Acccordingly, the foregoing disclosure, description, and figures are for illustrative purposes only and do not in any way limit the invention, which is defined only by the claims.

The invention claimed is:

1. A method, comprising:
    receiving a data subframe having a plurality of symbols;
    scaling the received data subframe:
    transforming the scaled subframe into a frequency domain with a Fast Fourier Transform (FFT):
    transforming the frequency domain subframe into a pseudo time domain with an Inverse Discrete Fourier Transform (IDFT):
    determining a location of invalid pseudo time domain samples in the data subframe corresponding to a location of invalid time domain samples in the scaled subframe;
    discarding the invalid pseudo time domain samples;
    recovering valid pseudo time domain samples to produce an updated data subframe; and
    processing the updated data subframe to produce demodulated data.

2. The method of claim 1, further comprising:
    generating the invalid pseudo time domain samples based on an electro-magnetic perturbation performed on the subframe.

3. The method of claim 1, wherein the plurality of symbols are single carrier frequency-division multiple access (SC-FDMA) symbols.

4. The method of claim 1, wherein discarding the invalid pseudo time domain samples includes zeroing out the invalid pseudo time domain samples.

5. The method of claim 1, further comprising:
    generating the invalid pseudo time domain samples during an electro-magnetic perturbation settling time.

6. The method of claim 1, further comprising:
    generating the invalid pseudo time domain samples during a settling time of an automatic gain controller (AGC).

7. A demodulator apparatus, comprising:
    an automatic gain controller (AGC) configured to scale a received signal having a plurality of subframes;
    a fast Fourier transform (FFT) device configured to transform the received signal into a frequency domain signal;
    a physical Sidelink channel configured to decode the frequency domain signal, the physical Sidelink channel including
        an inverse discrete Fourier transform (IDFT) device configured to transform a data subframe to a pseudo time domain and
        a symbol controller configured to determine a location of invalid pseudo time domain samples in the subframe corresponding to a location of invalid time domain samples in the scaled subframe and output an updated data subframe, wherein the physical Sidelink channel further processes the updated data subframe to produce demodulated data and the symbol controller is configured to discard invalid pseudo time domain samples and recover valid pseudo time domain samples to produce an updated data subframe.

8. The demodulator apparatus of claim 7, wherein the AGC is further configured to generate the invalid pseudo time domain samples of the subframe.

9. The demodulator apparatus of claim 7, wherein the plurality of subframes include single carrier frequency-division multiple access (SC-FDMA) symbols.

10. The demodulator apparatus of claim 7, wherein the symbol controller is further configured to discard the invalid pseudo time domain samples including zeroing out the invalid pseudo time domain samples.

11. A method, comprising:
    receiving a data subframe having a plurality of symbols;
    scaling the received data subframe:
    transforming the scaled subframe into a frequency domain with a Fast Fourier Transform (FFT):

transforming the frequency domain subframe into a pseudo time domain with an Inverse Discrete Fourier Transform (IDFT):

determining, by way of a system controller, a location of invalid pseudo time domain samples in the data subframe corresponding to a location of invalid time domain samples in the scaled subframe;

discarding, by way of the system controller, invalid pseudo time domain samples; and recovering valid pseudo time domain samples to produce an updated data subframe; and processing the updated data subframe to produce demodulated data.

12. The method of claim 11, further comprising:
generating the invalid pseudo time domain samples of the subframe by an automatic gain controller (AGC).

13. The method of claim 11, wherein the symbols of the plurality of symbols are single carrier frequency-division multiple access (SC-FDMA).

14. The method of claim 11, wherein discarding the invalid pseudo time domain samples includes zeroing out the invalid pseudo time domain samples.

15. The method of claim 11, further comprising:
generating the invalid pseudo time domain samples during an electro-magnetic perturbation settling time.

* * * * *